United States Patent [19]

Unger et al.

[11] Patent Number: 5,156,551
[45] Date of Patent: Oct. 20, 1992

[54] FRONT-FACING LINE TERMINAL BLOCK ASSEMBLY

[75] Inventors: John J. Unger, Elmhurst; William A. Brey, Schaumburg, both of Ill.

[73] Assignee: Reliance Comm/Tec Corporation, Chicago, Ill.

[21] Appl. No.: 771,363

[22] Filed: Oct. 1, 1991

[51] Int. Cl.$^5$ ............................................. H01R 13/00
[52] U.S. Cl. ........................................................ 439/49
[58] Field of Search ................. 439/49, 296, 299, 343, 439/345, 351, 544, 545, 571, 572, 573

[56] References Cited

U.S. PATENT DOCUMENTS

| | | | |
|---|---|---|---|
| 2,677,814 | 5/1954 | Miller | 439/49 |
| 4,179,170 | 12/1979 | Splitt et al. | 439/49 |
| 4,782,427 | 11/1988 | Marks | 439/49 |

OTHER PUBLICATIONS

"Reliable Electric Utility Products Central Office Equipment Catalog" pp. COE-77 through 80, 1988.

Primary Examiner—Joseph H. McGlynn
Attorney, Agent, or Firm—Trexler, Bushnell, Giangiorgi & Blackstone, Ltd.

[57] ABSTRACT

A front facing line terminal block assembly for a telecommunications network has an external housing mountable to a frame and a field block housing pivotally mounted to the external housing. The field block housing mounts a field block bearing a plurality of wire connectors. The external housing is capable of accepting the field block housing. A first set of retention elements is capable of positively locking the field block frame in a first, retracted position. A second set of retention elements is capable of positively locking the field block housing in a second pivotally rotated position wherein it is rotated outwardly of the external housing. An access door is pivotally mounted to the field block housing.

29 Claims, 5 Drawing Sheets

FRONT-FACING LINE TERMINAL BLOCK ASSEMBLY

BACKGROUND OF THE INVENTION

The present invention relates generally to a new and improved construction for a front-facing line terminal block assembly for use in an electronic telecommunications network. More specifically, the invention relates to an improved construction of a front-facing line terminal block assembly, having means for positively locking or retaining elements of the terminal block assembly in place thereby allowing for more definite positioning and for providing for greater resistance to back plane wire pressure, which is more durable, sturdy and functionally usable than the terminal block assemblies of the prior art.

Modern telecommunications networks and systems must employ reliable equipment, such as cross-connects and terminal blocks, in order form the network to perform properly and according to the customers' expectations. Thus, the equipment must meet many exacting standards. The equipment must be durable and easily accessible for repair.

The front-facing line terminal block assembly is one such piece of equipment. Line terminal block assemblies are used for connecting individual element wires from a larger telecommunications cable to other related equipment necessary for proper telecommunications signal transmission. The terminal block assemblies may be mounted on a network bay rack in a central office or in a universal enclosure of a telecommunications system. If the blocks face front (i.e. the wire-receiving terminals thereon face front) and their access doors open into an aisle between adjacent network bay frames, the wiring and equipment therein is more easily accessible for repair or maintenance. To allow for further access, the terminal blocks have a field block which rotates so that the terminal block housing can be easily mounted, and so that the back plane wiring can be accessed for servicing.

Front-facing terminal block assemblies of the prior art have performed their tasks satisfactorily, but each of the prior art constructions has certain drawbacks. Specifically, many terminal block assemblies are composed of all plastic components, which may not adequately protect the wiring and equipment contained therein due to the easy deformation and relative breakability inherent in man plastics.

Also, the plastic construction is more vulnerable to damage caused by random blows on impacts on the frame mounted terminal blocks. Also the weaker plastic material is vulnerable to damage caused by central office personnel sometimes stepping on the terminal blocks when trying to attain access to other positions on the frame.

Some of these terminal block assemblies have access doors which are mounted in positions which restrict rotation for easy access to the back plane wiring, to a rear connector, or for mounting to a frame or rack. Thus, the access doors sometimes have to be completely removed to allow rotation of the field block. This often leads to damage to or loss of the doors, resulting in greater costs to the network operator. Additionally, the plastic construction often does not provide positive retention of the field block in pre-determined positions allowing for easy access to the back plane wiring or connector, or for mounting to a rack.

The present invention provides an improved construction for a front-facing line terminal block assembly using metal structural parts. This construction is sturdier than the plastic terminal blocks, leading to greater durability. Additionally, the terminal block assembly of the invention has improved means which resist back plane wire pressure and means for retaining the field block in positions which allow for easy access to the back plane wiring or rear connector for servicing.

The terminal block assembly of the present invention provides for positive locking or retention of elements thereof in definite, distinct positions. The terminal block assembly of the invention is more durable in the workplace. The terminal block assembly of the invention also has improved mounting means which lessens the difficulty often attendant with mounting a terminal block on a network bay frame or the like.

OBJECTS AND SUMMARY OF THE INVENTION

A general object of the present invention is to provide a front-facing line terminal block assembly for use in a telecommunications network which is more durable than other, currently available terminal block assemblies.

A more specific object of the invention is to provide a front-facing line terminal block assembly having a rotatable field block and means for positively retaining the field block in definite positions.

A further object of the present invention is to provide a front-facing line terminal block assembly which provides greater resistance to back plane wire pressure than other, currently available terminal block assemblies.

Another object of the present invention is to provide a front-facing line terminal block assembly having an access door pivotally attached in such a manner as not to interfere with field block rotation.

An additional object of the invention is to provide a front-facing line terminal block assembly having improved mounting means for mounting the terminal block to a network bay frame or the like.

A further object of the present invention is to provide a front-facing line terminal block assembly having an access door which is removable from the terminal block only after concerted effort.

A front facing line terminal block assembly, constructed according to the teachings of the present invention, useful in a telecommunications network has an external housing mountable to a frame and a field block housing pivotally mounted to the external housing. The field block housing has a field block bearing a plurality of wire connectors. A first set of retention means capable of positively locking the field block frame in a retracted position, and a second set of retention means capable of positively locking the field block frame in a first pivotally rotated position are provided. An access door is pivotally mounted to the field block housing.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in which like reference numerals identify like elements, and in which:

DETAILED DESCRIPTION OF PREFERRED EMBODIMENTS

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Figure 2:
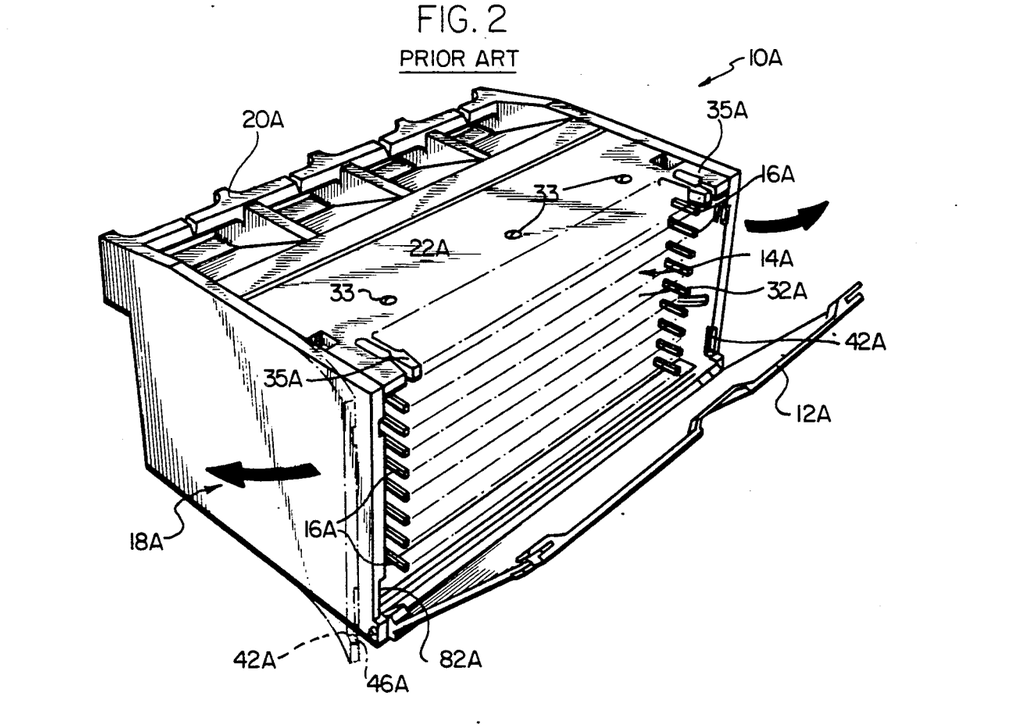
FIG. 2 is a perspective view, similar to that of FIG. 1, of a front-facing line terminal block assembly of the prior art having one side thereof deformed outwardly in phantom to illustrate operation of the front cover.
Figure 7:
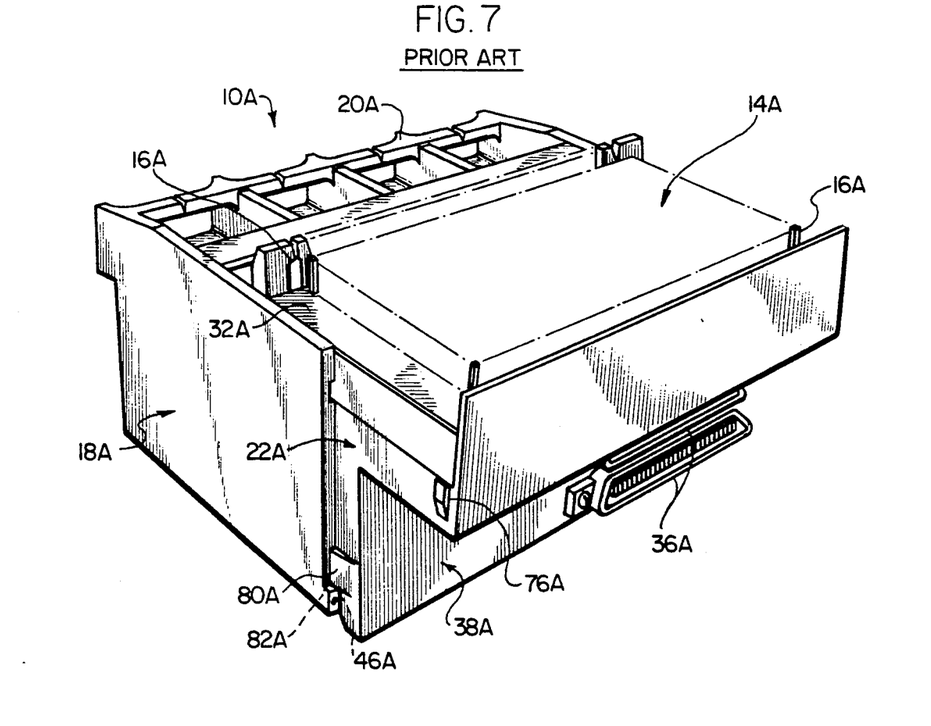
FIG. 7 is a perspective view of the terminal block assembly illustrated in FIG. 2 having its cover removed and with the field block rotated ninety degrees to provide access to the line connectors, showing the retention means.
Figure 8:
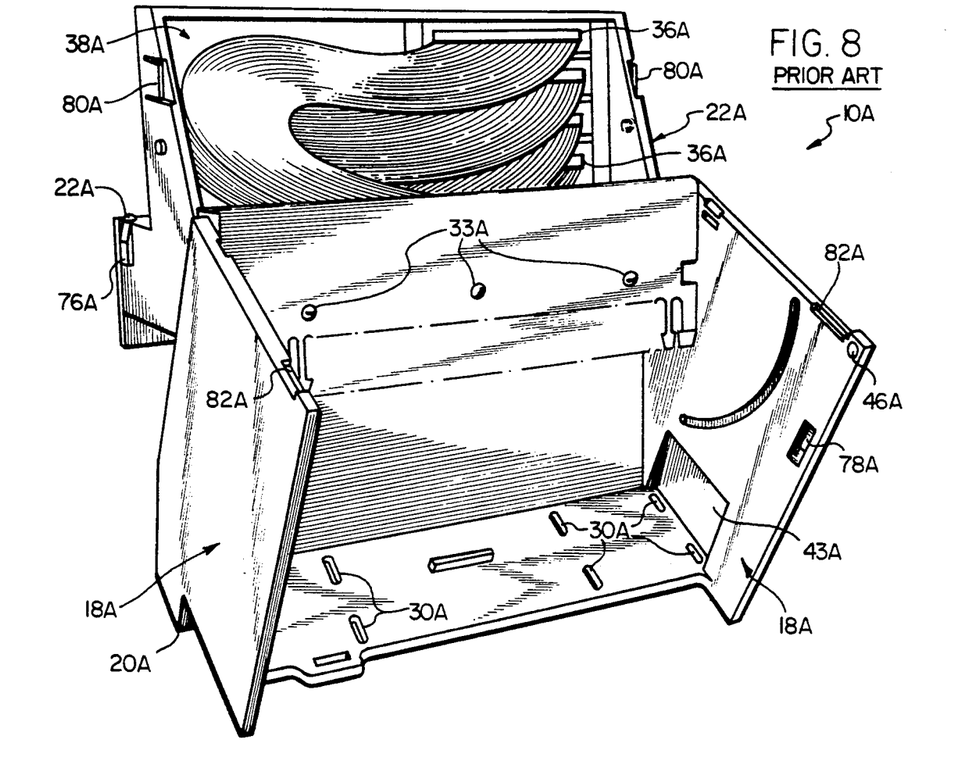
FIG. 8 is a perspective view of the block assembly illustrated in FIG. 7 with the field block being fully rotated with one side wall revealing the block mounting pin, and showing the mounting slots.
Figure 10:
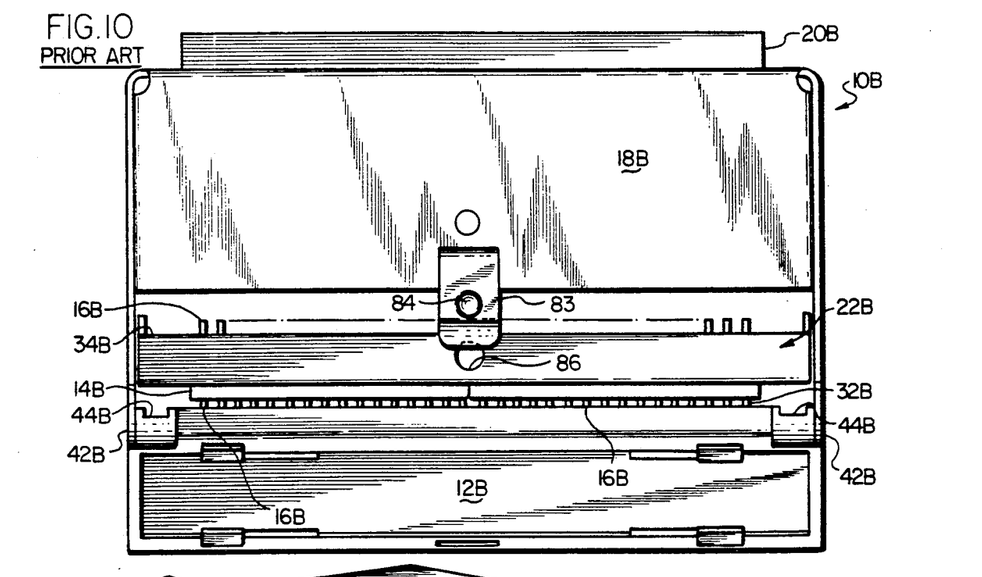
FIG. 10 is a bottom view of another terminal block of the prior art having the field block rotated somewhat showing the construction of the dimple lock.
Figure 11:
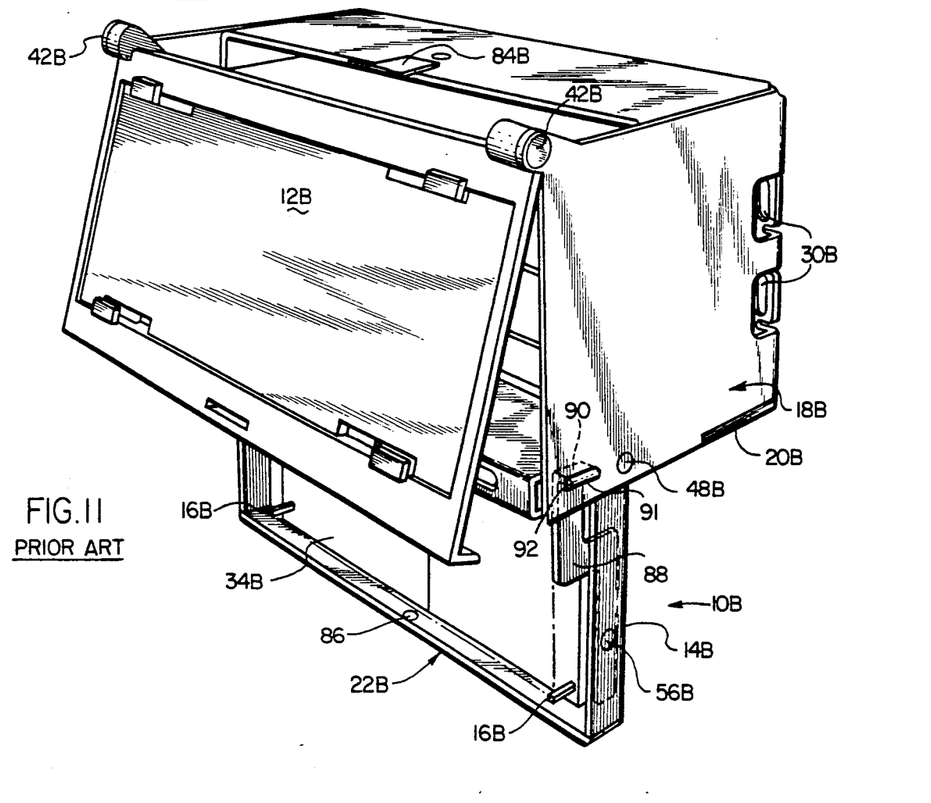
FIG. 11 is a perspective view of the terminal block of FIG. 10 with the field block rotated approximately one hundred and eighty degrees showing the tab locking device.

To show completely the advantages of the present invention, two prior art terminal blocks are also illustrated and will be discussed herein. The first is shown in FIGS. 2, 7, and 8, while the second is shown in FIGS. 10 and 11. Similar elements of these embodiments will be indicated by similar reference numerals bearing the suffixes "A" and "B," respectively. Also, the present invention will be discussed with respect to two embodiments: a connectorized terminal block, and a non-connectorized terminal block. The constructions of both embodiments are substantially the same, except for the differences to be noted herein.

Figure 1:
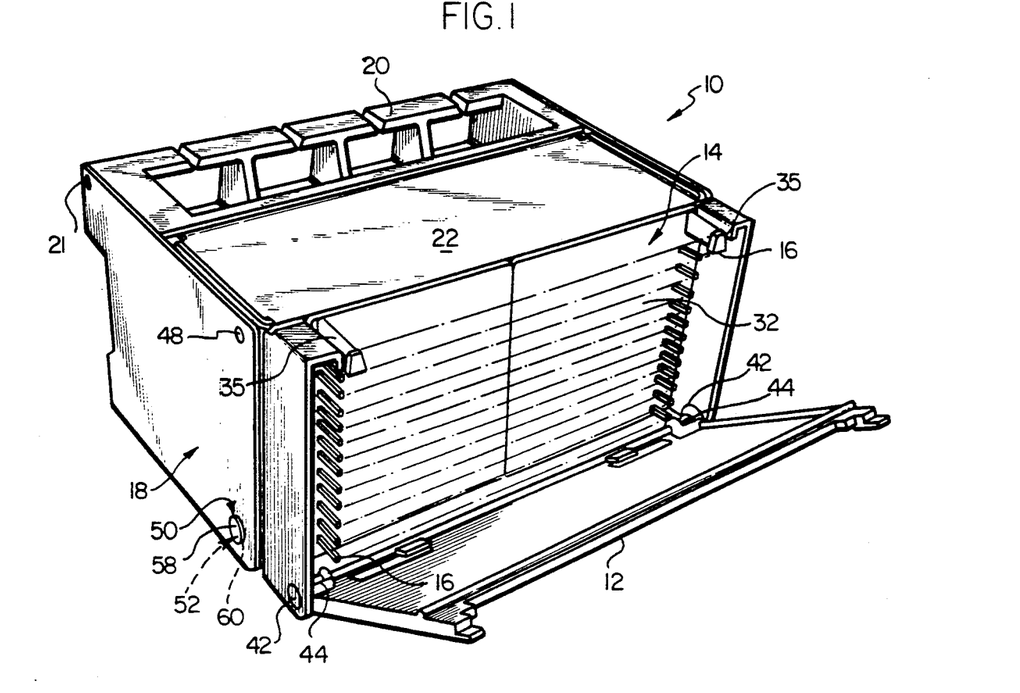
FIG. 1 is a perspective view of a connectorized version of a front-facing line terminal block assembly, constructed according to the teachings of the present invention, with its front cover rotated forwardly to reveal the wire connectors of the field block and the cover hinges.

Referring initially to FIG. 1, a front-facing line terminal block assembly 10, constructed according to the teachings of the present invention for use with a telecommunications network, having an access door 12 partially pivotally opened revealing a field block 14 bearing a plurality of wire connectors 16, is illustrated. The terminal block assembly 10 generally comprises an external housing 18, a fanning strip 20, and a field block housing 22.

The external housing 18 and the field block housing 22 are composed of a suitable metal, such as a relatively heavy gauge steel, which can be covered with a suitable coating, such as a baked-on enamel, to improve the wearability and to increase the aesthetic appeal thereof. This composition of the external housing 18 and the field block housing 22 is more sturdy than the prior art terminal block assembly 10A, illustrated in FIG. 2, which is composed of high impact plastic moldings. The external dimensions of the housing 18 are substantially similar to other existing housings currently used to house other telecommunications equipment, thereby resulting in greater cost savings because a newly configured housing need not be constructed. The terminal block assembly 10 is preferably a pre-existing molded plastic part, compatible with other, currently existing equipment.

The fanning strip 20 is preferably a molded plastic element and is releasably mounted to the external housing 18 at one end thereof by a plurality of fasteners 21. The fanning strip 20 is of known construction, and serves to separate and guide wires to and from the terminal block assembly 10. The fanning strip 20 is removable by means of fasteners 21 so that differently configured fanning strips can be used, or so that a broken fanning strip 20 can be replaced by a new fanning strip 20.

Figure 9:
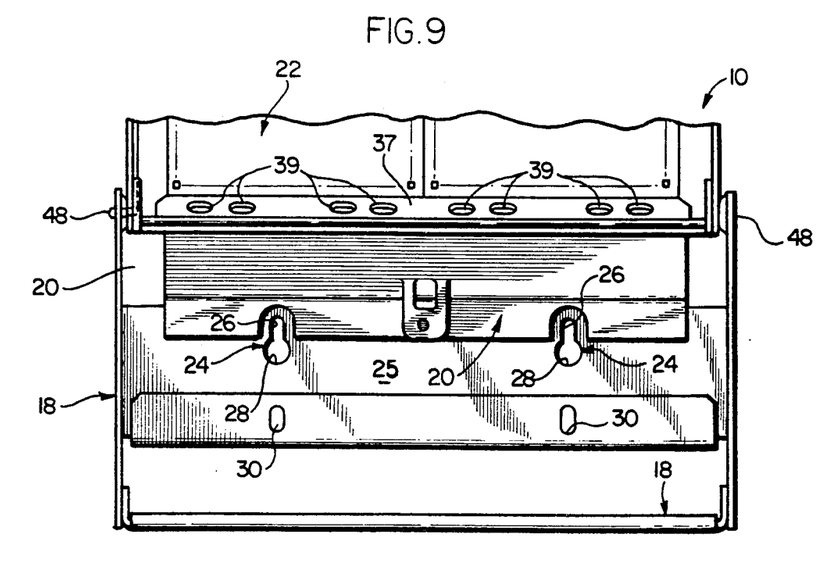
FIG. 9 is a front elevational view of the terminal block assembly illustrated in FIG. 6 showing the mounting means.

As shown in FIG. 9, mounting means in the form of a plurality of keyhole-type mounting holes 24 are disposed through the external housing 18 on a wall 25 thereof adjacent and below the fanning strip 20. Specifically, the plurality of keyhole-type mounting holes 24 have a slotted portion 26 and a substantially rounded portion 28 depending from and communicating with the slotted portion 26. The rounded portion 28 has a diameter substantially larger than a width of the slotted portion 26. The diameter of the rounded portion 28 is somewhat larger than a corresponding diameter of a mounting bolt head, while the width of the slotted portion 26 is slightly larger than a diameter of a mounting bolt shank. The mounting bolt is not shown for clarity. The construction of the mounting means allows a workman to thread mounting bolts into bores in a network bay frame a certain distance, and then place the rounded portions 28 of the plurality of mounting holes 24 over the heads of the mounting bolts. Gravity pulls the terminal block assembly 10 downwards so that the shanks of the mounting bolts slide into the slotted portions 26. The terminal block assembly 10 is held to the network bay frame by interference between the shanks and a terminal end of the slotted portions 26, thereby freeing the workman's hands to insert additional bolts and to tighten all of the mounting bolts.

In this latter regard, additional mounting slots 30 are disposed through the external housing 18 offset just below the rounded portions 28, and aligned axially with the slotted portions 26. The mounting slots 30 are substantially similar to the slotted portions 26, and both share common axes of elongation. After the terminal block assembly 10 is held in place by the initial mounting bolts attached to the network bay frame and projecting through the keyhole-type holes 24, a workman can insert further mounting bolts through the mounting slots 30 to increase the integrity of the joint between the terminal block assembly 10 and the network bay frame, not shown for clarity. If the network bay frame requires a configuration of mounting means substantially different from the one illustrated in FIG. 9, an adapter can be mounted to the bay frame, and then the terminal block assembly 10 can be mounted to the adapter in similar fashion to that described above.

The mounting means is a substantial improvement over the plurality of mounting slots 30A and 30B disposed through the external housings 18A and 18B of the prior art terminal block assemblies 10A and 10B, as illustrated in FIG. 8 and FIG. 11, respectively. Furthermore, this prior art terminal block assembly 10A required the placement of a relieved area 43A on the external housing 18A proximate to the mounting slots 30A to allow access for a tool, such as a screwdriver, to insert the mounting bolts. Even so, such access was limited at best, leading to a more difficult mounting process.

With the mounting slots 30A and 30B, a workman would have to use one hand to hold and to position the terminal block assemblies 10A and 10B while using the other hand to align and to insert the mounting bolts. This process was often very time consuming and tedious. Alternatively, two workmen could be employed: one to hold and to position the terminal block assemblies 10A and 10B, and another to align and to insert the mounting bolts. This alternative mounting method, however, is highly labor intensive, and thus, not economically viable.

The field block housing 22 is of dimensions somewhat smaller than corresponding dimensions of the external housing 18. The field block housing 22 houses the substantially planar field block 14 having a first side 32 and a second side 34. The first side 32 faces to the front of the terminal block assembly 10, and the second side 34 faces opposite the first side 32. The field block 14 is composed of an insulating material, such as a plastic, and is of known construction.

Figure 6:
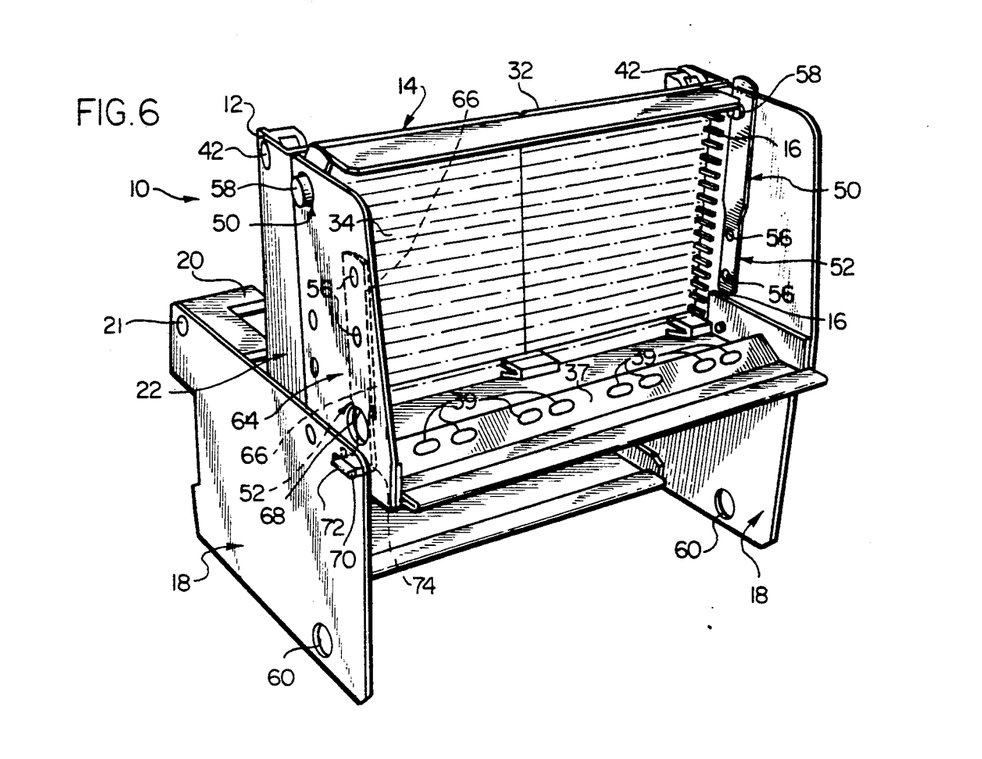
FIG. 6 is a perspective view of a non-connectorized version of the present invention with the field block rotated approximately one hundred and eighty degrees to allow for access to the back plane wiring and for mounting to an equipment frame.

The field block 14 bears a plurality of wire connectors 16 capable of accepting wires from telecommunications cables, not shown for clarity, which connectors extend through the field block 16 from the first side 32 to the second side 34 (shown in FIG. 6). The wire connectors 16 are shown in FIG. 1, and are of the well known wire-wrap form. Other forms of wire connectors 16 and corresponding field blocks 14 may be used. To guide wires to the wire connectors 16, a preferably molded front plastic fanning strip 35 is provided at the top edge of the field block 14. The fanning strip 35 may also be removable and replaceable by means of fasteners 33. Often such fanning strips are color-coded to indicate a particular use, such as with a given wire gauge, cable size or breakout pattern.

Lead wires, not shown for clarity, are attached to the wire connectors 16 at the second side 34 as well. Depending upon the embodiment of the invention, specifically, the connectorized version shown in FIG. 4, or the non-connectorized version shown in FIG. 6, the lead wires attached to the wire connectors 16 at the second side 34 are, respectively, connected to a plurality of pre-wired, terminals or connectors 36, shown in FIG. 4, or rejoin respective cables which run to the remainder of the telecommunications network. The connectorized version (FIG. 4) also has a terminal support member 38, useful for mounting and supporting the connectors 36, attached to the field block housing 22 adjacent to the second side 34 of the field block 14. The non-connectorized version (FIG. 6) has a flange 37 with a plurality of slots 39 to receive cable ties for maintaining the wires and associated cables in an orderly fashion.

The access door 12 is pivotally connected to the field block housing 22 by a pair of pivot pins 42. The pivot pins 42 are disposed through the field block housing 22 on an end thereof opposite to the fanning strip 35 and adjacent a bottom edge of the field block 14. The pivot pins 42 extend through the field block housing 22 and are inserted into complementary apertures 44 in the access door 12. Preferably, pivot pins 42 comprise plastic, expandible rivets.

The pivot pins 42 and the apertures 44 comprise hinge means about which the access door 12 may pivot through an arc measuring approximately one hundred and eighty degrees, between an open position and a closed position. In the closed position, the access door 12 engages the field block housing 22 is a flush recessed fashion, thereby protecting the wires and the wire connectors 16 disposed on the first side 32 of the field block 14. In the open position, the access door 12 allows for easy access to the wires and the wire connectors 16 disposed on the first side 32 of the field block 14, and can pivot completely out of the way to allow for servicing of the terminal block assembly 10.

The access door 12 itself, and thus the apertures 44, are composed of a strong, firm material, such as a durable plastic, and provides substantial protection to the wires and wire connectors 16 on the first side 32 of the field block 14. The pivot pins 42 are also composed of a plastic material. The frictioned engagement and interference between the pivot pins 42 and the apertures 44 provide a resistive force of sufficient magnitude to maintain the access door 12 in any position between the open and the closed position.

In this manner, the access door 12 can be swung into any position along the above-identified arc, and kept in that position without any external influence. Therefore, the hinge means provides a method for positively retaining the access door 12 in attachment with the field block housing 22, and also for definitely positioning the access door 12 throughout its pivot arc. Also, because the access door 12 is mounted to the field block housing 22, the access door 12 need not be removed or pivoted into a particular position in order for the field block housing 22 to be pivoted to allow for access to the back plane wiring, as more fully discussed hereinbelow. This allows the wires and the wire connectors 16 disposed on the first side 32 of the field block 14 to be protected by the access door 12 while the field block housing 22 is rotated to allow for access to the back plane wiring at the rear side 34, or to connectors 36 in the connectorized version.

The particular construction of the access door 12, the pivot pins 42, and the apertures 44 is a significant improvement over the access door constructions currently present in the prior art. Specifically, as shown in FIG. 2, the access door 12A is composed of a lightweight plastic, and has pivot pins 42A disposed on the bottom side edge thereof. The pivot pins 42A are integral with the access door 12A, and are insertable into pin apertures 46A disposed in the external housing 18A. The pivot pins 42A do not reside firmly within the pin apertures 46A. Also, because the terminal block assembly 10A is composed of plastic, and not metal, as described above, the pivot pins 42A may easily fall out of the pin apertures 46A during deformation of the plastic comprising the terminal block assembly 10A, as indicated in phantom line in FIG. 2.

In fact, because the access door 12A is mounted to the external housing 18A, and not to the field block housing 22A, the access door 12A must be removed to allow for rotation of the field block housing 22A to gain access to the back plane wiring. To do this, both side walls of the external housing 18A must be forcibly deformed, as shown in FIG. 2. Also, because the access door 12A must usually be removed to provide easier unlatching of the pivoting block, there is a great possibility that the access door 12A will be lost or damaged. This would lead to greater costs to the telecommunications operator. Moreover, in a typical installation, many such terminal blocks are mounted in a close side-by-side condition, making such outward flexing of the side walls difficult.

A somewhat improved prior art method for mounting the access door 12B is illustrated in FIG. 10 and FIG. 11. This prior art method is superior to the method discussed in the preceding two paragraphs. However, it does have some drawbacks. Specifically, the access door 12B is mounted to the external housing 18B by pivot pins 42B, constructed substantially similar to the pivot pins 42, which extend through the external housing 18B into apertures 44B, substantially similar to the apertures 44. Due to the frictioned engagement between the pivot pins 42B and the apertures 44B, the access door 12B may be resistively retained in a plurality of positions pivoted about the pivot pins 42B.

However, because the access door 12B is mounted to the external housing 18B and not to the field block housing 22B, the access door 12B must be rotated at least ninety degrees in order to allow for rotation of the field block housing 22B to access the back plane wiring. This may not be desirable because a workman may wish to keep the wires and wire connectors 16B disposed on the first side 32B of the field block 14B protected while working on the back plane wiring. Moreover, the door 12B severely limits access to the field block for pivoting the same, as will be apparent from FIGS. 10 and 11, and the ensuring discussion.

The field block housing 22 is pivotally mounted to the external housing 18 at an end thereof opposite to the fanning strip 20 and the mounting means 24 by fastening means in the form of metal rivets 48 on opposite sides of the field block housing 22. The rivets 48 are disposed through the field block housing 22 on and end thereof opposite to the pivot pins 42, and allow for the free rotation of the field block housing 22 with respect to the external housing 18 to allow for easy access to the back plane wiring, and/or the connectors 36, and the mounting means.

The field block housing 22 has exterior dimensions smaller than corresponding interior dimensions of the external housing 18. In this manner, the external housing 18 is capable of accepting the field block housing 22 therewithin. The field block housing 22 is capable of pivotal rotation about the rivets 48 into and out of the external housing 18, as shown respectively in FIG. 1 and in FIGS. 4 or 6. Thus, the external housing 18 covers and protects the field block housing 22 and the elements of the terminal block assembly 10 attached thereto when the field block housing is rotated within the external housing 18, as shown in FIG. 1.

As stated above, the field block housing 22 is pivotally rotatable about the rivets 48 to gain access to, among other things, the back plane wiring or connectors 36. However, it is desirable to have means for retaining the field block housing 22 in both its closed and rotated positions so that a workman will have both hands free to service the terminal block assembly 10. Moreover, in the closed position, substantial back plane pressure is often present from the back plane wiring, such that positive, full closure is desirable.

To do this, a first set of retention means 50 in the form of a pair of spring loaded dogs 52 are disposed on opposite ends of the field block housing 22 adjacent the bottom end of the field block 14, adjacent the second side 34 thereof. This first set of retention means is useful for maintaining the field block housing 22 in a retracted or closed position defined by a major position of the field block housing 22 being disposed within the external housing 18. Essentially only the connectors 16 on the first side 32 and a surrounding lip portion of the housing 22 projecting outwardly of the housing 18 in the connectorized version as show in FIGS. 1 and 4.

The unique construction of the first set of retention means 50 gives it greater resistance to back plane wire pressure when closed and allows pivoted positions of the field block housing 22 to be defined and maintained more positively than other retention means in the illustrated prior art.

Figure 3:
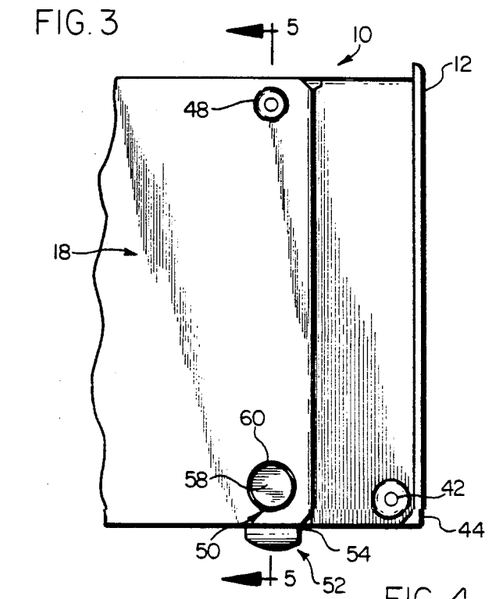
FIG. 3 is a partial side view of the terminal block assembly of FIG. 1 showing pin and lever retention means.
Figure 5:
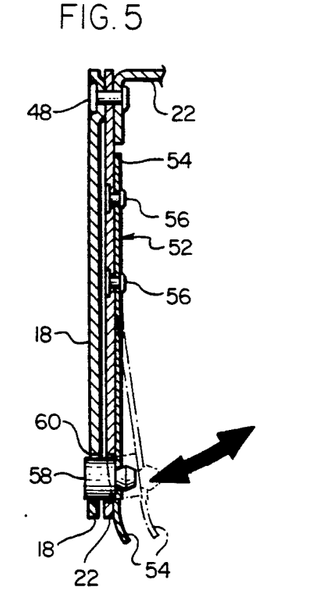
FIG. 5 is a partial sectional view of the pin and lever or spring-loaded dog retention means of the invention, showing the flexing thereof in phantom.

Specifically, as shown in FIG. 3 and FIG. 5, the spring loaded dogs 52 comprise a flat leaf spring 54 mounted to the field block housing 22 on an interior side thereof by a pair of fasteners (preferably rivets) 56 and a stud 58 mounted to the spring 54. The stud 58 extends away from the spring 54, substantially perpendicularly thereto and through a receiving through hole 59 in a sidewall of the field block housing 22. The spring 54 is composed of a strong, resilient material, such as a metal. The fasteners 56 are disposed on the spring 54 at areas thereof spaced from the stud 58, which is preferably composed of a plastic material.

The stud 58 is constructed so as to be insertable into a complementary retaining hole 60 disposed through the external housing 18 along a sidewall bottom edge thereof. The retaining hole 60 is disposed through the external housing 18 along a bottom edge thereof, and is alignable with hole 59 when the field block housing 22 is in its retracted or closed position relative to the external housing 18. The disposition of the retaining hole 60 is chosen so that the stud 58 will reside within and partially engage the retaining hole 60 when the field block housing 22 in pivoted into the retracted position.

The spring 54 can flex about the fasteners 56 so as to move the stud 58 into and out of the retaining hole 60, thereby allowing for the pivotal rotation of the field block housing 22 with respect to the external housing 18. To facilitate flexing of the spring 54 in order to remove the stud 58 from its residence within the retaining hole 60, the spring 54 terminates in a tab 62 at an end thereof opposite to the fasteners 56. The tab 62 is constructed so that it extends slightly beyond the bottom of the external and field block housings 18 and 22 when the field block housing 22 is in the retracted position, as shown in FIG. 3. The tab 62 is thus capable of manual access for applying a force so as to cause the spring 54 to flex. Once the stud 58 is removed from the retaining hole 60, the field block housing 22 can be pivotally rotated about the rivets 48. Digital access to the hole 60 may also be utilized to apply a spring-flexing force directly to the stud 58.

The field block housing 22 also has a second set of retention means 62. The second set of retention means 62 can take on at least two distinct forms depending upon the embodiment of the invention. With respect to the connectorized version of the invention shown in FIG. 4, the second set of retention means is constructed substantially similarly to the first set of retention means 50, and also comprises a pair of spring loaded dogs of the same construction as the dogs 52 shown in FIG. 5, mounted to opposite side walls of the field block housing 22.

Figure 4:
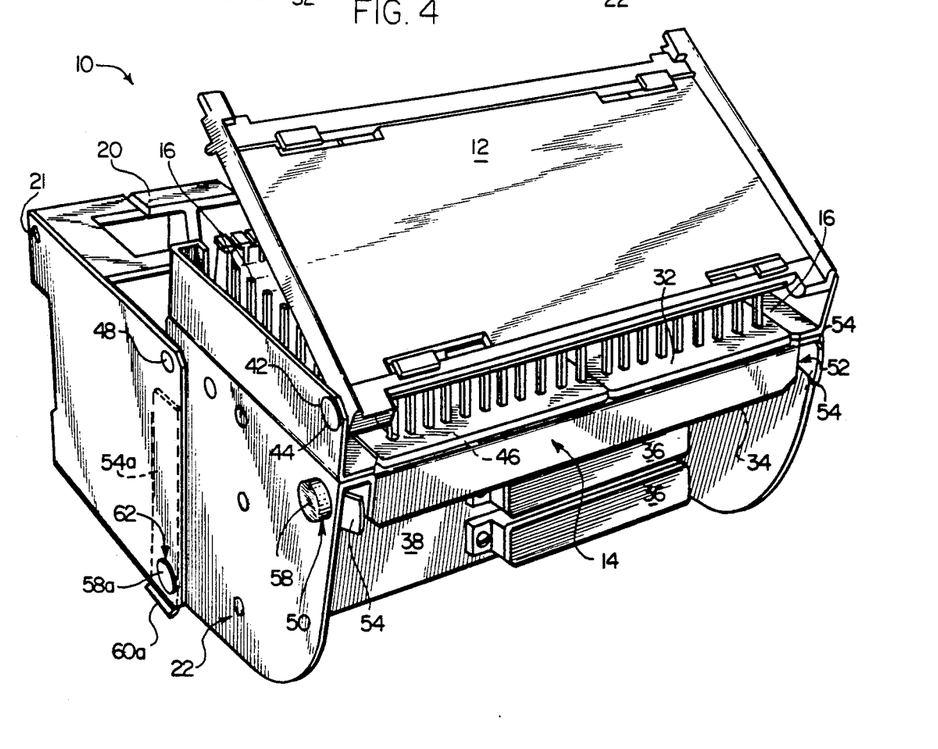
FIG. 4 is a perspective view of the block assembly of FIG. 1 with the field block rotated approximately ninety degrees to provide access to the line connectors.

However, the disposition of the second set of retention means 62 is located on the field block housing 22 translated substantially ninety degrees from the disposition of the first set of retention means with reference to an arc of rotation of the field block housing 22. Thus, the second set of retention means 62 retains the field block housing 22 in a second pivotally rotated position displaced substantially ninety degrees with respect to the first, retracted or closed position. When in the pivotally rotated position, the pre-wired terminals or connectors 36 are easily accessible from the front of the terminal block assembly 10, as shown in FIG. 4.

It is to be noted that the stud 58a of the second set of retention means 62 engages an interior wall of the external housing 18 when the field block housing 22 is in the retracted position and slides along this wall when the field block housing 22 is moved between the retracted position and the first pivotally rotated position thereby flexing the related spring 54a. Once the field block housing 22 is rotated fully into the first pivotally rotated position, the stud 58a "pops" into and through the retaining hole 60a under the influence of the resiliency of the spring 54a. The field block housing 22 is rotatable somewhat more than ninety degrees beyond the first pivotally rotated position for mounting the terminal block assembly 10 on a network bay frame, for instance, but this position is not detented in the connectorized version of the invention. When rotated beyond one hundred and eighty degrees, the field block housing 22 comes to rest against the external housing 18, permitting access to the mounting holes 30.

In the non-connectorized version of the invention, illustrated in FIG. 6, the second set of retention means 64 takes on a different form. Because this embodiment of the invention does not have pre-wired quick-connect terminals 36, the field block housing 22 must be rotated approximately one hundred and eighty degrees to allow a workman easy access to the back plane wiring disposed about the second side 34 of the field block 14.

To retain the field block housing 22 of the non-connectorized version in this approximately one hundred and eighty degree pivotally rotated position, a secondary set of retention means 64 is provided. The secondary set of retention means 64 comprises a spring 66, an access hole 68, a retention slot 70, and a tab slot 74. The spring 66 is substantially flat and L-shaped, and is attached to one end of center thereof to the interior of the field block housing 22 by a pair of fasteners 56, such as rivets and the like. At an end thereof opposite to the fasteners 56, the spring 66 terminates at a tab 72, which extends away from the spring 66 substantially perpendicularly thereto.

The tab slot 74 is disposed through the field block housing 22 in a position so that the tab 72 can freely extend therein. The retention slot 70 is disposed through the external housing 18 is a position so that the tab slot 74 and the retention slot 70 are aligned when the field block housing is in the second pivotally rotated position. In this manner, when the field block housing is pivotally rotated into the second pivotally rotated position, the tab 72 can "pop" into and through the tab slot 74 and the retention slot 70.

To remove the tab 72 from the tab slot 74 and the retention slot 70, the spring 66 must be flexed. To facilitate the flexing of the spring 66, the access hole 68 is disposed through the field block housing 22 in a position between the plurality of fasteners 56 and the tab slot 74 and preferably in close proximity to the tab slot 74. The actuation hole 68 is of sufficient size to accept a human finger or other suitable tool to allow for flexing of the spring 66. Once the spring 66 had been flexed and the tab 72 removed from the retention slot 70, the field block housing 22 can be pivotally rotated either beyond the second pivotally rotated position or back into the retracted position.

Both the first, second, and secondary sets of retention means 50, 62, and 64, respectively, as well as their combination provides a significant improvement over the retention means available in the prior art because, for example, they allow for positive locking of the field block housing 22 into certain, specific positions. This allows for definite positioning of the field block housing 22. Also, those means provide greater resistance to back plane wire pressure. The illustrated prior art embodiments do not provide these advantages.

For example, as illustrated in FIG. 7 and FIG. 8, one prior art terminal block assembly 10A utilizes a retention means comprising a plurality of plastic raised tangs 76A and recesses 78A to maintain the field block housing 22A in the retracted position. Specifically, the field block housing 22A has a tang 76A formed on either side thereof which is insertable into a complementarily constructed recess 78A formed on the interior wall of the external housing 18. The tang 76A and the recess 78A are respectively disposed so that the tang 76A resides within the recess 78A when the field block housing 22A is in the retracted position.

Also, this terminal block assembly 10A utilizes second retention means comprising a tab 80A and a notch 82A for retaining the field block housing 22A in the pivotally rotated position. Specifically, the tab 80A is formed on the field block housing 22A and the notch 82A is formed on the external housing 18A so that the tab 80A resides within the notch 82A when the field block housing 22A is in the first pivotally rotated position.

The retention means of the prior art terminal block assembly 10A has a number of drawbacks making it undesirable to many telecommunications network operators. Because the terminal block assembly 10A is composed of plastic, the strength of the retention means is severely limited. The tang 76A can often become dislocated from the detent 78A due to back plane wire pressure, e.g. the plastic side walls can flex outwardly too readily in response to this pressure. The tab 80A and the notch 82A suffer from the same sort of structural problem. That is, the tab 80A and the notch 82A do not provide adequate retentive forces to maintain the field housing block 22A in the first pivotally rotated position when subject to the influence of forces often associated with a workman working on the terminal block 10A. Hence, this prior art form of retention means does not provide for positive retention of the field block housing 22A or for definite positioning thereof.

Another retention means of the prior art is shown in FIG. 10 and FIG. 11. The retention means that maintains the field block housing 22B in the retracted position comprises a resilient clasp 83 having a dimple 84, and a hole 86. The dimple 84 resides within the hole 86 to maintain the positioning of the field block housing 22B. However, this arrangement yields all too readily to pressure from the back plane wiring.

To keep the field block housing 22B in the second pivotally rotated position, the field block housing 22B has an elongate spring 88 held by a single rivet 56B which terminates at right-angled projection 90 formed with a rounded-over end 91. The projection 90 is insertable into a notch 92 in the external housing 22B when the field block housing is in the second pivotally rotated position, thereby allowing access to the back plane wiring. However, this second retention means yields too easily to forces normally applied while working on the back plane wiring and/or mounting the unit to a rack. Also, access to the clasp 83 is severely limited by the mounting arrangement of the access door 12B, as described above.

The terminal block assembly 10, constructed according to the teachings of the present invention, provides distinct advantages over the terminal blocks of the prior art. Specifically, the terminal block assembly 10 is more durable, sturdy and more functionally usable than other, currently available terminal blocks. The access door 12 is mounted so as not to interfere with rotation of the field block housing 22. Also, the retention means 50, 62, and 64 provide for positive locking and definite positioning of the field block housing 22; something that the other terminal blocks cannot provide. Furthermore, the terminal block assembly 10 does not require removal of any parts thereof (such as access door 12) to provide access thereto to a workman.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A front facing line terminal block assembly for a telecommunications network comprising: an external housing mountable to a frame; a field block; a field block housing for mounting the field block, and pivotally mounted to the external housing; a first releasable retention means for positively locking the field block frame in a first, retracted position wherein the field block housing is received within the external housing; second releasable retention means for positively locking the field block frame in a second, pivotally rotated position wherein the field block housing is pivotally rotated outwardly of the external housing with respect to the first, retracted position; and an access door pivotally mounted to the field block housing.

2. A front facing line terminal block assembly as defined in claim 1 wherein the field block housing is pivotally mounted to the external housing by means of a rivet.

3. A front facing line terminal block assembly as defined in claim 1 wherein the external housing and the field block housing are composed of a metal material.

4. A front facing line terminal block assembly as defined in claim 1 further comprising keyhole-type mounting holes disposed on the external housing having a slotted portion and a depending rounded portion; the rounded portion being capable of accepting a head of a mounting bolt, and the slotted portion being capable of accepting a shank of a mounting bolt to facilitate mounting thereof on a frame.

5. A front facing line terminal block assembly as defined in claim 1 wherein the first and second sets of retention means are substantially identical in construction.

6. A front facing line terminal block assembly as defined in claim 1 wherein the first retention means comprises a spring loaded dog.

7. A front facing line terminal block assembly as defined in claim 6 wherein the spring loaded dog comprises a spring bearing a projecting stud.

8. A front facing line terminal block assembly as defined in claim 7 wherein the spring is mounted to the field block housing and a retaining hole is disposed on the external housing for receiving and retaining the stud when the field block housing is in the first position.

9. A front facing line terminal block assembly as defined in claim 7 wherein the spring has a tab which facilitates gripping and flexing of the spring.

10. A front facing line terminal block assembly as defined in claim 9 further comprising a removable/replaceable fanning strip mounted to at least one of the external housing and the field block housing.

11. A front facing line terminal block assembly as defined in claim 1 wherein the second retention means is offset angularly, with respect to a pivotal motion defined by the field block housing relative to the external housing, from the first retention means.

12. A front facing line terminal block assembly as defined in claim 11 wherein the second retention means are offset substantially ninety degrees from the first retention means.

13. A front facing line terminal block assembly as defined in claim 1 wherein the retracted position is defined by the external housing accepting the field block housing recessed therein.

14. A front facing line terminal block assembly as defined in claim 13 wherein the first pivotally rotated position is defined by the field block housing being pivotally rotated with respect to the external housing away from the position recessed therein.

15. A front facing line terminal block assembly as defined in claim 1 wherein the second retention means comprises a spring loaded dog.

16. A front facing line terminal block assembly as defined in claim 15 wherein the spring loaded dog comprises a spring bearing a projecting stud.

17. A front facing line terminal block assembly as defined in claim 16 wherein the spring is mounted to the field block housing and a retaining hole is disposed on the external housing for receiving and retaining the stud when the field block housing is in the second position.

18. A front facing line terminal block assembly as defined in claim 16 wherein the spring has a tab which facilitates gripping and flexing of the spring.

19. An improvement in a front facing line terminal block assembly for a telecommunications network having an external housing mountable to a frame; a field block; a field block housing for mounting the field block, and pivotally mounted to the external housing; said improvement comprising: first releasable retention means for positively locking the field block frame in a first, retracted position; second releasable retention means for positively locking the field block frame in a second, pivotally rotated position; and an access door pivotally mounted to the field block housing.

20. The improvement as defined in claim 19 wherein the second retention means is offset angularly, with respect to a pivotal motion defined by the field block housing relative to the external housing, from the first set of retention means.

21. The improvement as defined in claim 19 wherein the second pivotally rotated position is defined by the field block housing being pivotally rotated with respect to the external housing.

22. The improvement as defined in claim 19 wherein the second retention means are offset substantially one hundred and eighty degrees from the first retention means.

23. The improvement as defined in claim 19 wherein the first retention means comprises a spring loaded dog.

24. The improvement as defined in claim 23 wherein the spring is mounted to the field block housing and a retaining hole is disposed on the external housing for receiving and retaining the stud when the field block housing is in the first position.

25. The improvement as defined in claim 23 wherein the spring loaded dog comprises a spring bearing a projecting stud.

26. The improvement as defined in claim 25 wherein the spring has a tab which facilitates gripping and flexing of the spring.

27. The improvement as defined in claim 19 wherein the second retention means comprises a spring having a tab and a retention slot for accepting the tab.

28. The improvement as defined in claim 27 wherein the retention slot is disposed on the external housing and the spring is disposed on the field block housing.

29. The improvement as defined in claim 27 wherein the second retention means further comprises a manual access hole facilitating manual flexing of the spring.

* * * * *